United States Patent
Kompella

(10) Patent No.: US 8,797,886 B1
(45) Date of Patent: Aug. 5, 2014

(54) VERIFICATION OF NETWORK PATHS USING TWO OR MORE CONNECTIVITY PROTOCOLS

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 897 days.

(21) Appl. No.: 12/966,869

(22) Filed: Dec. 13, 2010

Related U.S. Application Data

(63) Continuation of application No. 11/525,685, filed on Sep. 22, 2006, now Pat. No. 7,852,778.

(60) Provisional application No. 60/763,420, filed on Jan. 30, 2006.

(51) Int. Cl.
*H04J 3/14* (2006.01)

(52) U.S. Cl.
USPC ........... 370/248; 370/396; 370/401; 370/400; 370/242

(58) Field of Classification Search
USPC .......................... 370/400, 401, 396, 242, 248
See application file for complete search history.

(56) References Cited

U.S. PATENT DOCUMENTS

| | | | |
|---|---|---|---|
| 5,253,248 A * | 10/1993 | Dravida et al. ............... | 370/228 |
| 5,848,128 A | 12/1998 | Frey | |
| 6,173,411 B1 | 1/2001 | Hirst et al. | |
| 6,304,546 B1 | 10/2001 | Natarajan et al. | |
| 6,453,403 B1 | 9/2002 | Czajkowski | |
| 6,507,869 B1 | 1/2003 | Franke et al. | |
| 6,542,934 B1 | 4/2003 | Bader et al. | |
| 6,618,360 B1 | 9/2003 | Scoville et al. | |
| 6,751,188 B1 | 6/2004 | Medved et al. | |
| 6,850,253 B1 | 2/2005 | Bazerman et al. | |
| 6,910,148 B1 | 6/2005 | Ho et al. | |
| 6,982,953 B1 | 1/2006 | Swales | |
| 7,055,063 B2 | 5/2006 | Leymann et al. | |
| 7,120,693 B2 | 10/2006 | Chang et al. | |

(Continued)

FOREIGN PATENT DOCUMENTS

| | | |
|---|---|---|
| EP | 1367750 A1 | 12/2003 |
| EP | 1861963 A2 | 12/2007 |

(Continued)

OTHER PUBLICATIONS

Kompella et al., "Detecting Multi-Protocol Label Switched (MPLS) Data Plane Failures," Network Working Group, RFC 4379, Cisco Systems, Inc., Feb. 2006, 50 pp.

(Continued)

*Primary Examiner* — Ricky Ngo
*Assistant Examiner* — Dewanda Samuel
(74) *Attorney, Agent, or Firm* — Shumaker & Sieffert, P.A.

(57) ABSTRACT

Techniques are described for verifying a status of a set of paths through a computer network for two or more connectivity protocols. For example, a node uses a first connectivity protocol to concurrently learn information that will cause packets conforming to the first connectivity protocol and packet conforming to a second connectivity protocol to traverse a set of paths through a computer network. After learning this information, the node may verify a status of each of the paths using the first connectivity protocol. In addition, the node may verify a status of each of the paths using the second connectivity protocol. By verifying the status of the paths using both the first and the second connectivity protocols, the node may be able to quickly and accurately determine whether a path has failed.

15 Claims, 8 Drawing Sheets

(56) References Cited

U.S. PATENT DOCUMENTS

| | | | |
|---|---|---|---|
| 7,130,304 | B1 | 10/2006 | Aggarwal |
| 7,139,263 | B2 | 11/2006 | Miller et al. |
| 7,151,775 | B1* | 12/2006 | Renwick et al. ............. 370/400 |
| 7,161,946 | B1* | 1/2007 | Jha ................................ 370/401 |
| 7,184,437 | B1 | 2/2007 | Cole et al. |
| 7,206,836 | B2 | 4/2007 | Dinker et al. |
| 7,219,030 | B2 | 5/2007 | Ohtani |
| 7,236,453 | B2 | 6/2007 | Visser et al. |
| 7,359,377 | B1 | 4/2008 | Kompella et al. |
| 7,362,700 | B2 | 4/2008 | Frick et al. |
| 7,391,719 | B2 | 6/2008 | Ellis et al. |
| 7,406,030 | B1 | 7/2008 | Rijsman |
| 7,406,035 | B2 | 7/2008 | Harvey et al. |
| 7,433,320 | B2* | 10/2008 | Previdi et al. ................. 370/248 |
| 7,447,167 | B2 | 11/2008 | Nadeau et al. |
| 7,471,638 | B2 | 12/2008 | Torrey et al. |
| 7,506,194 | B2 | 3/2009 | Appanna et al. |
| 7,508,772 | B1 | 3/2009 | Ward et al. |
| 7,522,599 | B1 | 4/2009 | Aggarwal et al. |
| 7,523,185 | B1 | 4/2009 | Ng et al. |
| 7,561,527 | B1 | 7/2009 | Katz et al. |
| 7,609,637 | B2 | 10/2009 | Doshi et al. |
| 7,639,624 | B2 | 12/2009 | McGee et al. |
| 7,724,677 | B2 | 5/2010 | Iwami |
| 7,738,367 | B1 | 6/2010 | Aggarwal et al. |
| 7,765,306 | B2 | 7/2010 | Filsfils et al. |
| 7,852,778 | B1 | 12/2010 | Kompella |
| 7,940,646 | B1 | 5/2011 | Aggarwal et al. |
| 7,957,330 | B1 | 6/2011 | Bahadur et al. |
| 7,990,888 | B2* | 8/2011 | Nadeau et al. ................. 370/254 |
| 8,503,293 | B2* | 8/2013 | Raszuk ........................ 370/228 |
| 2002/0093954 | A1* | 7/2002 | Weil et al. ..................... 370/389 |
| 2003/0112749 | A1* | 6/2003 | Hassink et al. ............. 370/225 |
| 2005/0083936 | A1 | 4/2005 | Ma |
| 2005/0195741 | A1 | 9/2005 | Doshi et al. |
| 2005/0259634 | A1 | 11/2005 | Ross |
| 2005/0281192 | A1 | 12/2005 | Nadeau et al. |
| 2006/0095538 | A1 | 5/2006 | Rehman et al. |
| 2006/0133300 | A1 | 6/2006 | Lee et al. |
| 2006/0233107 | A1 | 10/2006 | Croak et al. |
| 2006/0239201 | A1 | 10/2006 | Metzger et al. |
| 2006/0262772 | A1 | 11/2006 | Guichard et al. |
| 2006/0285500 | A1 | 12/2006 | Booth, III et al. |
| 2007/0041554 | A1 | 2/2007 | Newman et al. |
| 2007/0061103 | A1 | 3/2007 | Patzschke et al. |
| 2007/0165515 | A1 | 7/2007 | Vasseur |
| 2007/0180104 | A1* | 8/2007 | Filsfils et al. ................. 709/224 |
| 2007/0180105 | A1 | 8/2007 | Filsfils et al. |
| 2007/0207591 | A1 | 9/2007 | Rahman et al. |
| 2007/0220252 | A1 | 9/2007 | Sinko |
| 2007/0263836 | A1 | 11/2007 | Huang |
| 2007/0280102 | A1 | 12/2007 | Vasseur et al. |
| 2008/0004782 | A1 | 1/2008 | Kobayashi et al. |
| 2008/0049622 | A1 | 2/2008 | Previdi et al. |
| 2008/0074997 | A1 | 3/2008 | Bryant et al. |
| 2008/0247324 | A1 | 10/2008 | Nadeau et al. |
| 2008/0253295 | A1 | 10/2008 | Yumoto et al. |
| 2009/0016213 | A1 | 1/2009 | Lichtwald |
| 2009/0019141 | A1 | 1/2009 | Bush et al. |
| 2009/0046579 | A1 | 2/2009 | Lu et al. |
| 2009/0046723 | A1 | 2/2009 | Rahman et al. |
| 2009/0232029 | A1 | 9/2009 | Abu-Hamdeh et al. |
| 2011/0063973 | A1 | 3/2011 | VenkataRaman et al. |
| 2013/0028099 | A1 | 1/2013 | Birajdar et al. |

FOREIGN PATENT DOCUMENTS

| | | |
|---|---|---|
| EP | 1864449 A2 | 12/2007 |
| EP | 1891526 A2 | 2/2008 |
| EP | 1891526 B1 | 2/2012 |

OTHER PUBLICATIONS

Katz et al., "Bidirectional Forwarding Detection (BFD)," Internet Engineering Task Force (IETF), RFC 5880, Juniper Networks, Jun. 2010, 49 pp.

Katz et al., "Bidirectional Forwarding Detection (BFD) for IPv4 and IPv6 (Single Hop)," Internet Engineering Task Force (IETF), RFC 5881, Juniper Networks, Jun. 2010, 7 pp.

Katz et al., "Generic Application of Bidirectional Forwarding Detection (BFD)," Internet Engineering Task Force (IETF), RFC 5882, Juniper Networks, Jun. 2010, 15 pp.

Katz et al., "Bidirectional Forwarding Detection (BFD) for Multihop Paths," Internet Engineering Task Force (IETF), RFC 5883, Juniper Networks, Jun. 2010, 6 pp.

Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.

Nadeau et al., "Bidirectional Forwarding Detection (BFD) for the Pseudowire Virtual Circuit Connectivity Verification (VCCV)," Internet Engineering Task Force (IETF), RFC 5885, Cisco Systems, Inc., Jun. 2010, 11 pp.

Kolon, "BFD spots router forwarding failures," Network World, www.networkworld.com/news/tech/2005/030705techupdate.html, Mar. 7, 2005, 3 pp.

Atlas, "ICMP Extensions for Unnumbered Interfaces," draft-atlas-icmp-unnumbered-00, Dec. 9, 2005, 8 pp.

Atlas, "ICMP Extensions for Unnumbered Interfaces," draft-atlas-icmp-unnumbered-01, Feb. 2006, 8 pp.

Bonica et al., "Generic Tunnel Tracing Protocol (GTTP) Specification," draft-bonica-tunproto-01.txt, IETF Standard-Working-Draft, Internet Engineering Task Force, Jul. 2001, 20 pp.

Berkowitz, "Router Renumbering Guide," Network Working Group, RFC 2072, Jan. 1997, 41 pp.

Mannie, "Generalized Multi-Protocol Label Switching Architecture," Network Working Group, Internet draft, draft-ietf-ccamp-gmpls-architecture-07.txt, May 2003, 56 pp.

Kompella et al., Signalling Unnumbered Links in Resource ReSerVation Protocol—Traffic Engineering (RSVP-TE), Network Working Group, RFC 3477, Jan. 2003, 8 pp.

Sun Hai-feng, "Advanced TCP Port Scan and it's Response," O.L. Automation 2005, vol. 24, No. 4, China Academic Electronic Publishing House, http://www.cnki.net, Apr. 24, 2005, 2 pp. (Abstract only).

"Using the IP unnumbered configuration FAQ," APNIC, www.apnic.net/info/faq/ip_unnumb.html, Jul. 1, 2005, 2 pp.

"Configure the loopback Interface," www.juniper.net/techpubs/software/junos/junos56/index.html, Last printed Nov. 7, 2005, 2 pp.

Zvon, RFC 2072, [Router Renumbering Guide]—Router Identifiers, Chapter 8.3, Unnumbered Interfaces, www.zvon.org/tmRFC/RFC2072/output/chapter8.html , last printed on Nov. 7, 2005, 2 pp.

"ICMP (Internet Control Message Protocol)," Data Network Resource, www.rhyshaden.com/icmp.html, last printed Nov. 10, 2005, 4 pp.

"Traceroute," Webopedia, www.webopedia.com/TERM/t/traceroute.heml, Aug. 26, 2004, 1 p.

"RFC 2151—(rfc2151)—A primer on Internet and TCP/IP Tools and Utilities," www.rfcsearch.org/rfcview/RFC/2151.html, last printed Nov. 9, 2005, 3 pp.

Gorry Fairhurst, "Internet Control Message protocol," Internet Control Protocol, (ICMP), www.erg.abdn.ac.uk/users/gorry/course/inet-pages/icmp.html, last printed Sep. 6, 2006, 3 pp.

"ActiveXperts Ping backgrounds (PING is part of the ActiveSocket Toolkit)," ActiveSocket Network Communication Toolkit 2.4, Activexperts, www.activexperts.com/activsocket/toolkits/ping.html, last printed Nov. 10, 2005, 3 pp.

Vijay Mukhi et al., "Internet Control Message Protocol ICMP," www.vijaymukhi.com/vmis/icmp, last printed Sep. 6, 2006, 5pp.

"Configure an Unnumbered Interface," www.juniper.net/techpubs/software/junos/junos56/index.html, last printed Nov. 7, 2005, 1 p.

Chen et al., "Dynamic Capability for BGP-4," Network Working Group, Internet Draft, draft-ietf-idr-dynamic-cap-03.txt, Dec. 2002, 6 pp.

(56) References Cited

OTHER PUBLICATIONS

Sangli et al., "Graceful Restart Mechanism for BGP," Network Working Group, Internet Draft, draft-ietf-idr-restart-06.txt, http://toolsietf.ort/html/draft-ietf-idr-restart-06, Jan. 2003, 10 pp.

Katz et al., BFD for Multipoint Networks, Network Working Group, Internet Draft, draft-ietf-bfd-multipoint-00.txt, Oct. 2011, 29 pp.

Saxena et al., Detecting Data-Plane Failures in Point-to-Multipoint Mpls—Extensions to LSP Ping, Internet Engineering Task Force (IETF) RFC 6425, Nov. 2011, 28 pp.

Hedge et al., Multipoint BFD for MPLS, Network Working Group, Internet-Draft, draft-chandra-hedge-mpoint-bfd-for-mpls-00.txt, Mar. 2012, 12 pp.

U.S. Appl. No. 13/730,737, by Meher Aditya Kumar Addepalli, filed Dec. 28, 2012.

U.S. Appl. No. 13/731,993, by Meher Aditya Kumar Addepalli, filed Dec. 31, 2012.

Rahul Aggarwal; "OAM Mechanisms in a MPLS Layer 2 Transport Networks"; 2004; IEEE Communications Magazine; pp. 124-130.

\* cited by examiner

VERIFICATION OF NETWORK PATHS USING TWO OR MORE CONNECTIVITY PROTOCOLS

This application is a continuation of U.S. application Ser. No. 11/525,685, filed Sep. 22, 2006, which claims the benefit of U.S. Provisional Application No. 60/763,420, filed Jan. 30, 2006, the entire contents of each of which are incorporated herein by reference.

TECHNICAL FIELD

The invention relates to computer networks, and, in particular, to connection verification in computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The links and nodes the message passes through while traveling from the first node to the second node is referred to as a path. For example, suppose the message passes through a third node while traveling from the first node to the second node. In this case, the path leads from the first node to the third node to the second node.

Packet-based computer networks increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

Links and nodes in a computer network may fail without warning. Consequently, one of the LSPs that the first node was using to communicate with the second node may stop functioning. To ensure that the first node and the second node do not send messages on a LSP that is not functioning, the nodes may periodically verify the status of the path by sending a message through the path and receiving a response through the path.

In some situations, however, verifying the connectivity along the LSPs may be difficult. For example, verifying the connectivity along the LSPs may be difficult where LSP traffic is dynamically load balanced over multiple paths using equal cost multi-path (ECMP) or other mechanisms. In this situation, verification over each of the multiple paths of an LSP may require continual use of a complex, resource intensive connectivity protocol. For example, a node may use the Label Switched Path Ping (LSP Ping) protocol to verify each of the LSPs.

SUMMARY

In general, the invention is directed to techniques of verifying the connectivity status of multiple paths through a computer network. The techniques may be useful in testing the connectivity of label switched paths (LSPs), and particularly useful where LSP traffic is load balanced over multiple paths using equal cost multi-path (ECMP) or other mechanisms.

According to the techniques, a first node in the computer network uses a first connectivity protocol to learn one or more paths through the computer network from the first node to a second node. The first node also learns information that, when included in a packet conforming to a first connectivity protocol, causes the packet to traverse one of the paths. Concurrently, the first node learns information that, when included in a packet conforming to a second connectivity protocol, causes the packet to traverse one of the paths. That is, the first node does not need to use the second connectivity protocol to learn such information. The first node may then verify the connectivity status of each of the paths using the first connectivity protocol and may also verify the connectivity status of each of the paths through the network using the second connectivity protocol.

For example, in certain embodiments, the first connectivity protocol is the label switched path (LSP) ping protocol and the second connectivity protocol is the Bidirectional Forwarding Detection (BFD) protocol. LSP ping exploration packets are used to discover paths between a source node and a target node along one or more LSPs. As described herein, the LSP ping protocol can be extended to concurrently discover packet header information necessary to direct packets along the paths for both connectivity protocols. In other words, in one embodiment, the techniques of this invention allow a first node to use the LSP ping protocol to determine paths through a network for a multi-path LSP, and concurrently determine packet header information necessary to direct LSP ping packets as well as BFD packets along each path.

After learning the packet headers of the paths through the network for the BFD protocol and the LSP ping protocol, the first node may use either or both of the LSP ping protocol and the BFD protocol to monitor and verify the connectivity status of each of the paths of an LSP from the first node to a second node. For example, using the packet headers learned during the LSP ping exploration process, the first node may periodically use the LSP ping protocol, but primarily rely on the BFD protocol, which is a more efficient, less resource intensive protocol for testing connectivity.

In one embodiment, a method comprises using a first connectivity protocol to concurrently learn information that will cause packets conforming to the first protocol and packets conforming to a second connectivity protocol to traverse individual paths through a computer network. The method also comprises outputting packets according to the second connectivity protocol at a first rate in accordance with the learned information to perform a first verification of the status of each of the paths.

In another embodiment, a network device comprises a network exploration module to concurrently learn information that will cause packets conforming to the first connectivity protocol and packets conforming to a second connectivity protocol to traverse individual paths in a set of paths through a computer network. In addition, the network device comprises a first module to output packets according to the second connectivity protocol at a first rate in accordance with the learned information to perform a first verification of the status of each of the paths.

In another embodiment, the invention is directed to a computer-readable medium containing instructions. The instructions cause a programmable processor to use a first connectivity protocol to concurrently learn information that will cause packets conforming to the first connectivity protocol and packets conforming to a second connectivity protocol to traverse individual paths in a set of paths through a computer network. The instructions also cause the processor to output packets according to the second connectivity protocol at a first rate in accordance with the learned information to perform a first verification of the status of each of the paths.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
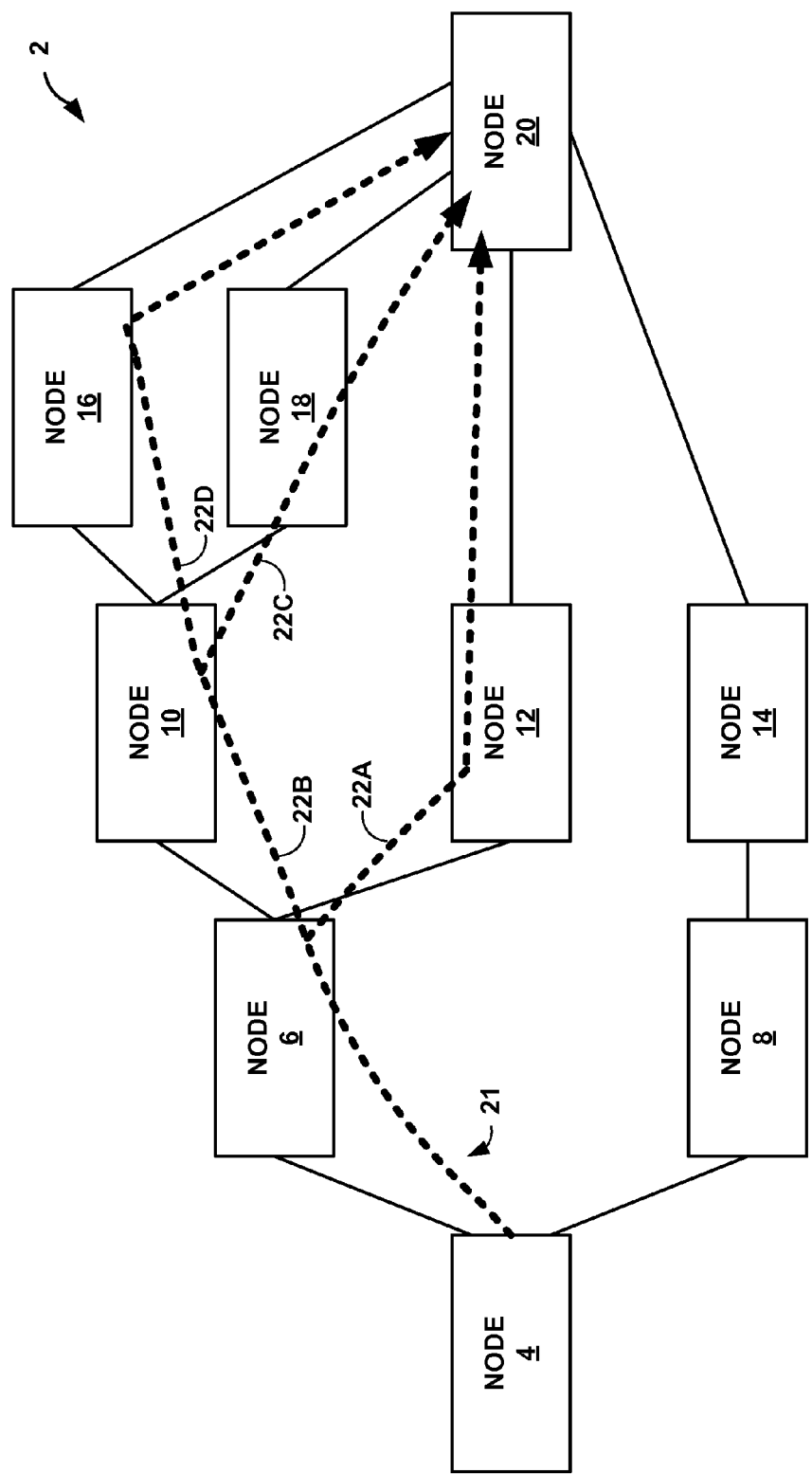
FIG. 1 is a block diagram illustrating an exemplary computer network.

FIG. 1 is a block diagram illustrating an exemplary computer network 2. Nodes 4 through 20 may represent a wide range of network devices. For example, nodes 4 through 20 may be routers, switches, personal computers, servers, modems, network telephones, televisions, television set-top boxes, firewall devices, communications satellites, network appliances, and other network-enabled devices.

Nodes 4 through 20 are connected to one another through links represented by lines. For instance, node 4 is connected to nodes 6 and 8. The links may be any type of computer network transmission medium. For instance, a link in computer network 2 may be a fiber optic cable, an Ethernet cable, a coaxial cable, a universal serial bus cable, a wireless connection, and so on.

In the example of FIG. 1, a label switched path (LSP) 21 conveys network traffic from a source node 4 to a destination node 20. In this example, traffic traversing LSP 21 is load-balanced across the multiple paths 22A-22D using equal cost multi-path (ECMP) or other mechanisms. For example, node 6 may load balance Multi-protocol label switch (MPLS) traffic traversing LSP 21 across paths 22A and 22B. Similarly, node 10 load balances MPLS traffic traversing LSP 21 across paths 22C and 22D.

While computer network 2 is operating, a link or a node in computer network 2 may fail. For example, a storm may sever the link between node 12 and node 20. As another example, a power failure or a programming fault may cause node 10 to stop functioning. Failure of a link or node may occur without warning to nodes that use the link or node to communicate. Consequently, for a period of time, a node may continue sending messages through a path that is no longer functioning. Packets sent through such a path may be lost or delayed.

In accordance with the techniques of the invention, source node 4 utilizes a plurality of connectivity protocols to monitor and verify that each of paths 22 of LSP 21 are working properly. For example, in one embodiment, source node 4 utilizes the LSP ping protocol as a first connectivity protocol to probe LSP 21 to learn of the multiple paths 22 and provide extensive testing of each path 22 along LSP 21. LSP ping provides an extensive mechanism for probing and testing the verifying the data plane of LSP 21 against the control plane. However, due to the overhead and resource consumption of LSP ping, source node 4 may execute an extensive LSP ping test of LSP 21 at a low frequency, e.g., once every minute.

In addition, source node 4 may utilize the Bidirectional Forwarding Detection (BFD) protocol as a second connectivity protocol that provides a more efficient yet potentially less accurate connectivity test for paths 22 of LSP 21. For example, source node 4 may utilize the BFD protocol to detect a data plane failure in the forwarding path of LSP 21. Although the BFD protocol cannot be used to verify the MPLS control plane against the data plane, BFD can be used, as described herein, to detect data plane failures.

In other words, source node 4 may utilize the BFD protocol as a light-weight means of testing only the data plane. The light-weight nature of the BFD protocol may allow source node 4 to implement the BFD protocol in hardware or firmware. The BFD protocol may provide faster detection with sub-second granularity of data plane failures, and may be used for a greater number of LSPs. For example, source node 4 may execute a low-cost BFD test of LSP 21 at a higher frequency, e.g., once every 10 milliseconds, between iterations of the more extensive LSP ping protocol used to periodically verify the control plane against the data plane by re-synchronizing MPLS LSP 21 and Forwarding Equivalence Class (FEC) mappings.

Moreover, according to the techniques, source node 4 uses LSP ping exploration packets according to the LSP ping protocol (i.e., a first connectivity protocol) to learn of paths 22 and concurrently learn information that will cause packets conforming to the LSP ping protocol as well as packets conforming to BFD protocol to traverse the paths 22. Consequently, source node 4 does not need to use the BFD protocol to learn information that will cause packets conforming to the BFD protocol to traverse paths 22.

More specifically, as described herein, the LSP ping protocol may be extended to concurrently discover packet header information necessary to direct packets along paths 22 for both connectivity protocols. In one embodiment, the techniques of this invention allow source node 4 to use the LSP ping protocol to determine paths through a network for a multi-path LSP, and concurrently determine packet header information necessary to direct LSP ping packets as well as BFD packets along each of paths 22.

Thus, source node 4 may be viewed as using LSP-ping to boot-strap a BFD session. The initiation of fault detection for a particular <MPLS LSP, FEC> combination results reply packets, in the ping mode, between the ingress and egress LSRs for that <MPLS LSP, FEC> (nodes 4, 10 in the example of FIG. 1). An LSP-ping echo request from source node 4 and echo reply messages from intermediate nodes along LSP 21 carry a BFD discriminator TLV for the purpose of session establishment.

After using LSP ping to learn the packet header information necessary to direct test packets along all paths 22 for both the BFD protocol and the LSP ping protocol, the source node 4 may use either or both of the LSP ping protocol and the BFD protocol to monitor and verify the connectivity status of each of paths 22. For example, using the packet header information learned during the LSP exploration process, source node 4 may periodically use the LSP ping protocol, but primarily rely on the BFD protocol, which is a more efficient, less resource intensive protocol for testing connectivity. For example, source node 4 may output LSP ping packets at a first rate (e.g., once every minute) in accordance with the learned packet header information to perform a first verification of a connectivity status of each of paths 22. In addition, source node 4 may output BFD packets at a second rate (e.g., every 10 milliseconds) in accordance with the learned packet header information to perform a higher frequency verification of the status of each of paths 22.

The techniques of this invention may present one or more advantages. For example, the size of packets in the second connectivity protocol (e.g., BFD) may be very limited relative to the size of packets conforming to the first connectivity protocol (e.g., LSP ping). This may make the second connectivity protocol very efficient by reducing computation and signaling time. However, packets conforming to the second connectivity protocol may be limited in use, and not useable for exploration. In this situation, the invention may allow source node 4 to use an extended first connectivity protocol to learn of paths 22 and information (e.g., packet header information) necessary to direct packets for both connectivity protocols along the paths. In this manner, embodiments of the invention may utilize multiple connectivity protocols to monitor and verify connectivity for multiple paths, e.g., multi-path LSP 21, where bypass LSPs or MPLS pseudo wires may be used.

Figure 2:
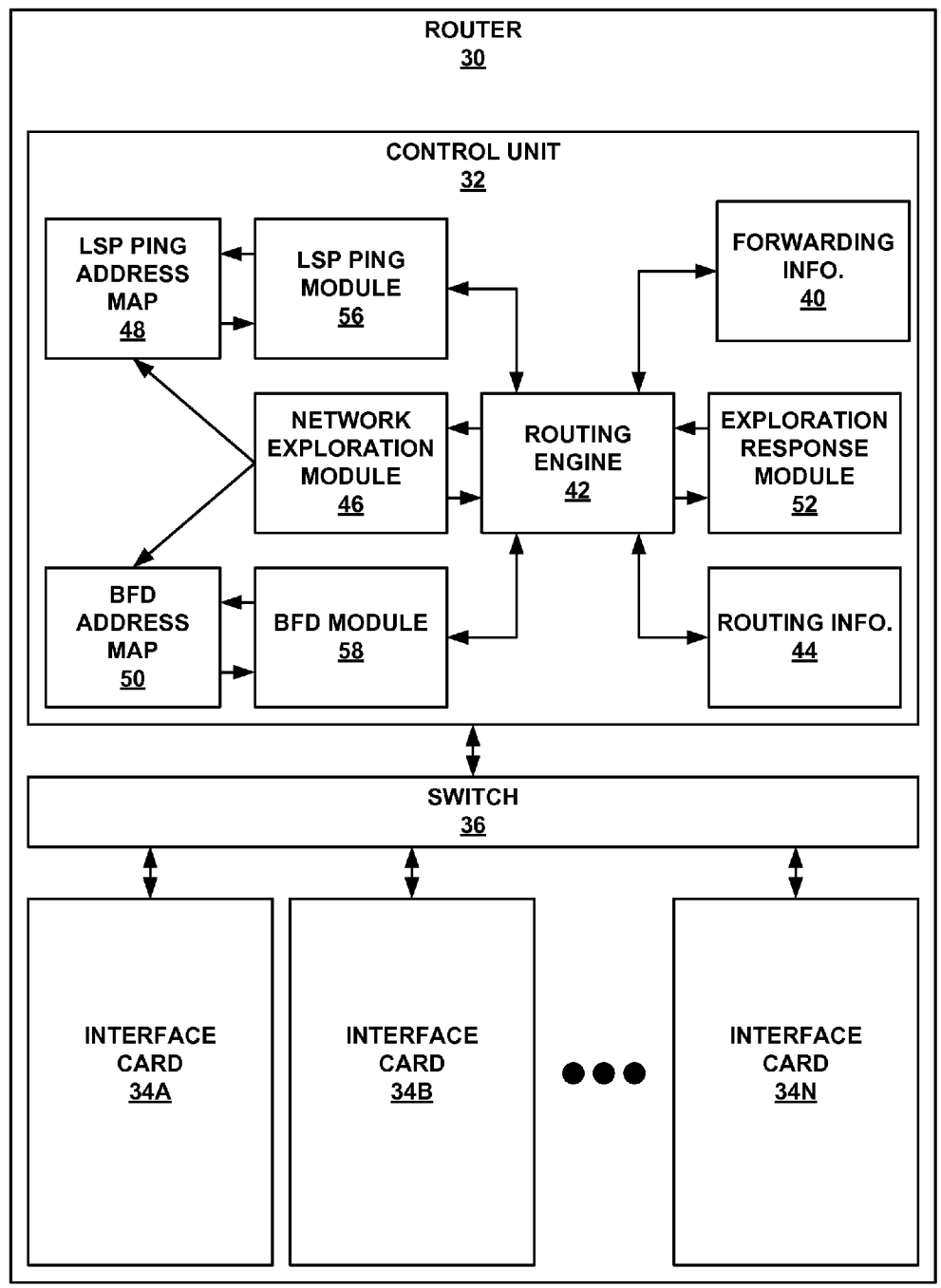
FIG. 2 is a block diagram illustrating an exemplary embodiment of a node in the computer network shown in FIG. 1.

FIG. 2 is a block diagram illustrating an exemplary embodiment of a node in computer network 2 (FIG. 1). For example, a network device may embody a node of computer network 2. This network device may comprise a label switching router 30, and may represent source node 4 of FIG. 1. For example, router 30 may use any of a variety of protocols, e.g., the Label Distribution Protocol (LDP) or the Route Reservation Protocol (RSVP), to establish LSP 21 to communicate network traffic to a destination node 20. For example, the network traffic may comprise Multi-protocol label switching (MPLS) traffic carrying Voice over Internet Protocol (VOIP) data, audio and video content, web data, files, virtual private network data, and so on.

In this example, router 30 comprises a control unit 32 and a set of interface cards 34A through 34N (collectively, interface cards 34). Interface cards 34A through 34N contain interface controllers 38A through 38N (collectively, interface controllers 38), respectively. A high-speed switch 36 facilitates communication between control unit 32 and interface cards 34.

Routing engine 42 that maintains routing information 44 to describe a topology of a network, such as computer network 2, and uses that information to derive forwarding information 40. In general, router 30 receives packets from the computer network through interface cards 34. When an interface card, e.g., interface card 34A, receives a packet, control unit 32 uses forwarding information 40 to forward the packet. If the packet represents a control plane packet conforming to a routing protocol, routing engine 42 updates routing information 44 and regenerates forwarding information 40.

In addition, router 30 includes two connectivity protocols to monitor and verify the control plane and data plane of the LSPs serviced by the router. In this example, the first connectivity protocol may be the LSP-Ping Protocol provided by LSP ping module 56, and the second connectivity protocol may be the BFD protocol supported by BFD module 58.

Initially, control unit 32 may instruct a network exploration module 46 to initiate an exploration of each LSP serviced by router 30, such as LSP 21. Network exploration module 46 uses the LSP ping protocol to learn information that will cause packets conforming to the LSP ping protocol and packets conforming to the BFD protocol to traverse each of paths 22 through computer network 2 associated with LSP 21. For example, network exploration module 46 may discover with the LSP ping protocol, for each path in the set of paths, packet header information that will cause a packet conforming to the LSP ping protocol to traverse the path and to concurrently discover with the LSP ping protocol, for each path in the set of paths, packet header information that will cause a packet conforming to the BFD protocol to traverse the path. For instance, network exploration module 46 may discover sets of destination addresses in the packet headers for the LSP ping and the BFD protocol.

In a further example, network exploration module 46 may discover a packet header of the LSP ping protocol by sending an exploration packet in accordance with the LSP ping protocol to a second node in computer network 2. The exploration packet may specify a set of variable information (e.g., destination addresses) of a packet header that conforms to the LSP ping protocol. In addition, the network exploration packet may specific a set of variable information (e.g., destination addresses) of a packet header that conforms to the BFD protocol. The exploration packet may also include fixed information of a packet header in the BFD protocol. For instance, the fixed information may comprise a source address, a source or a destination port associated with the BFD protocol, and so on.

Continuing the previous example, network exploration module 46 receives an exploration response packet from the second node in response to the exploration packet. The exploration response packet may specify a subset of the set of variable information of a packet header that conforms to the LSP ping protocol for each node on LSP 21 immediately downstream to the second node. Each of these subsets specify variable information that would direct an LSP ping packet to a node on LSP 21 immediately downstream to the second node. For example, if router 30 is node 4 and node 6 is the second node, an exploration response from node 6 includes a subset of the set of variable information that would direct an LSP ping packet to node 10 and a subset of the set of variable information that would direct an LSP ping packet to node 12. In addition, the exploration response packet may specify a subset of the set of variable information of a packet header that conforms to the BFD protocol for each node on LSP 21 immediately downstream to the second node. Each of these subsets specifies variable information that would direct a BFD packet to a node on LSP 21 immediately downstream to the second node.

After receiving the exploration response packet, network exploration module 46 issues an exploration packet for each node on LSP 21 immediately downstream to the second node. Each of these exploration packets specify the subsets of variable information returned by the second node for a node on LSP 21 immediately downstream to the second node. Network exploration module 46 then receives an exploration response from each of these nodes.

Network exploration module 46 repeats the process of issuing exploration packets to identify each path along the LSP until the egress router of the LSP is reached. Network exploration module 46 then inserts the variable information (e.g., destination prefix or addresses) for paths between router 30 and the destination node for the LSP ping protocol in LSP ping address map 48. In addition, network exploration module 46 inserts the variable information (e.g., destination prefix or addresses) for paths between router 30 and the destination node for the BFD protocol in BFD address map 50.

After network exploration module 46 finishes discovering the destination addresses for the LSP ping and the BFD protocols, routing engine 42 may direct LSP ping module 56 to output packets according to the LSP ping packet at a first rate in accordance with the learned information in LSP ping address map 48 to perform verification of a status of each of paths 22. In addition, routing engine 42 may direct BFD module 58 to output packets according to the BFD connectivity protocol at a second rate in accordance with the learned information in BFD address map 50 to perform a second verification of the status of each of paths 22.

To verify a status of each of paths 22, LSP ping module 56 may send an echo-request or a traceroute packet in the LSP ping protocol on each of paths 22. This packet may have the packet header information associated with the path stored in LSP ping address map 48. For instance, the packet may include packet header information from the subset of the set of variable information (e.g., a destination address) associated with the path. Subsequently, LSP ping module 56 may receive a response to the packet. LSP ping module 56 may then infer the connectivity status of the path based on the receipt of the response, the content of the response, or a combination of the two.

Similarly, BFD module 58 may send a packet in the BFD protocol on each of paths 22. This packet may have the packet header information associated with the path stored in BFD address map 50. For instance, the packet may include information from the subset of the set of variable information (i.e., a destination address) associated with the path. Subsequently, BFD module 58 may receive a response to the packet. BFD module 58 may then infer the connectivity status of the path based on the receipt of the response, the content of the response, or a combination of the two.

Control unit 32 may also include an exploration response module 52. Exploration response module 52 may be designed to receive an exploration packet in the LSP ping protocol. Like the exploration packets sent by network exploration module 46, this exploration packet may include a set of variable information of a packet header in the LSP ping protocol and a set of variable information of a packet header in the BFD protocol. After receiving the exploration packet, exploration response module 52 may generate a subset of the set of variable information for a packet header in the LSP ping protocol. Exploration response module 52 may also generate a subset of the set of the variable information for a packet header in the BFD protocol. A packet containing information from one of the subsets is routed from a node that originated the exploration packet to a node immediately downstream to router 30. Once exploration response module 52 generates the subsets, exploration response module 52 may send the subsets to the node that originated the exploration packet.

Figure 3:
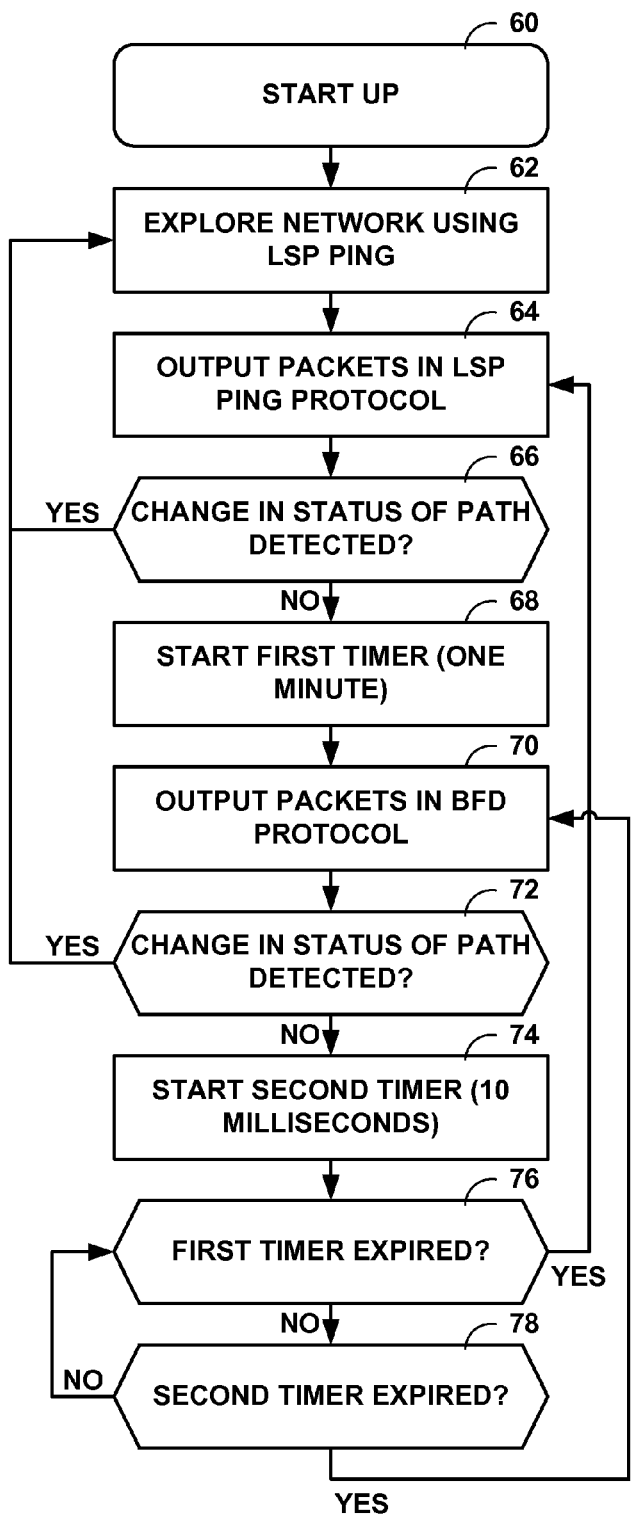
FIG. 3 is a flowchart illustrating an exemplary operation of a routing engine of a node in accordance with the exemplary embodiment shown in FIG. 2.

FIG. 3 is a flowchart illustrating an exemplary operation of a routing engine of a node in accordance with the exemplary embodiment shown in FIG. 2. The operation of routing engine 42 may begin when router 30 is started up (60). After starting, routing engine 42 may direct network exploration module 46 to use the LSP ping protocol to concurrently learn information that will cause packets conforming to the LSP ping protocol and packets conforming to a BFD protocol to traverse each of the paths through computer network 2 from router 30 to a destination node (62).

When network exploration module 46 finishes discovering information, routing engine 42 directs LSP ping module 56 to output packets according to the LSP ping protocol with the learned information in LSP ping address map 48 to perform a first verification of a status of each of the paths through computer network 2 from router 30 to the destination node (64). If LSP ping module 56 detects a change in one of the paths ("YES" of 66), routing engine 42 instructs network exploration module 46 to explore the paths again (62). On the other hand, if LSP ping module 56 does not detect a change in one of the paths ("NO" of 66), routing engine 42 sets a first timer that expires after one minute (68).

Next, routing engine 42 directs BFD module 58 to output packets according to the BFD protocol with the learned information to perform a second verification of the status of each of the paths (70). If BFD module 58 detects a change in one of the paths ("YES" of 72), routing engine 42 instructs network exploration module 46 to explore the paths again (62). On the other hand, if BFD ping module 58 does not detect a change in one of the paths ("NO" of 72), routing engine 42 sets a second timer that expires after ten milliseconds (74).

After setting the second timer, routing engine 42 checks whether the first timer has expired (76). If the first timer has expired ("YES" of 76), routing engine 42 instructs LSP ping module 56 to output packets according to the LSP ping protocol with the learned information to perform a first verification of the status of each of the paths (64). Otherwise, if the first timer has not expired ("NO" of 76), routing engine 42 checks whether the second timer has expired (78). If the second timer has expired ("YES" of 78), routing engine 42 instructs BFD module 58 to output packets according to the BFD protocol with the learned information in BFD address map 50 to perform a second verification of a status of each of the paths (70). On the other hand, if the second timer has not expired ("NO" of 78), routing engine 42 loops back to check whether the first timer has expired (76).

Figure 4:
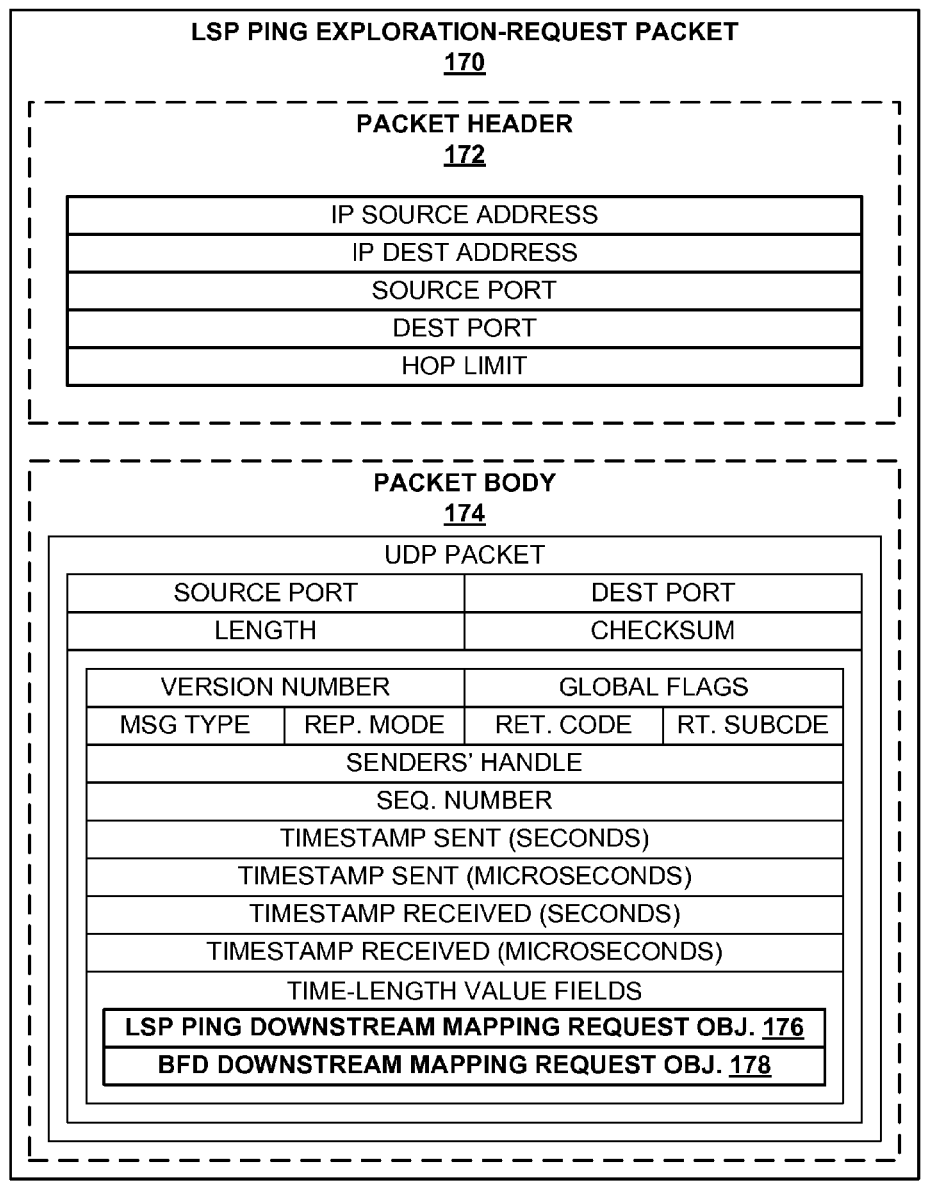
FIG. 4 is a block diagram illustrating an exemplary format of a LSP ping exploration packet that has been extended to facilitate the discovery of packet header information for the Bidirectional Forwarding Detection protocol.

FIG. 4 is a block diagram illustrating an exemplary format of a LSP ping exploration packet 170 that has been extended to facilitate the discovery of packet header information for the Bidirectional Forwarding Detection protocol. Packet 170 comprises a packet header 172 and a packet body 174.

As illustrated in FIG. 4, packet header 172 contains data fields consistent with Internet Protocol version 4 (IPv4) or Internet Protocol version 6 (IPv6). For instance, packet header 172 includes an IP source address, an IP destination address, and a hop limit. (In IPv4, hop limit 184 is referred to as "time-to-live".)

In the LSP ping protocol, packet body 174 consists of a User Datagram Protocol (UDP) packet. The data portion of this UDP packet contains LSP ping information. As illustrated in FIG. 4, the LSP ping information includes a version number, a set of global flag, a message type, a report type, a return code, a return subcode, a sender's handle, a sequence number, a timestamp sent (seconds) field, a timestamp sent (microseconds) field, a timestamp received (seconds) field, and a timestamp sent (microseconds) field. In addition, the LSP ping information contains a set of Type-Length-Value (TLV) fields. As described in the IETF draft, each TLV field contains a type field, a length field, and a value field. TLV fields may convey a wide range of information.

In accordance with the techniques of this invention, the TLV fields include an LSP ping downstream mapping request object 186. LSP ping downstream mapping request object 186 contains a set of destination addresses. In addition, the TLV fields include an LSP ping exploration packet contains a BFD downstream mapping request object 188. BFD downstream mapping request object 188 also contains a set of destination addresses.

When a node other than the destination node receives packet 170, the node uses the sets of destination addresses in downstream mapping request objects to generate subsets of the destination addresses that correspond to paths from the node that originated packet 170 to a node immediately downstream to the node that received packet 170.

Figure 5:
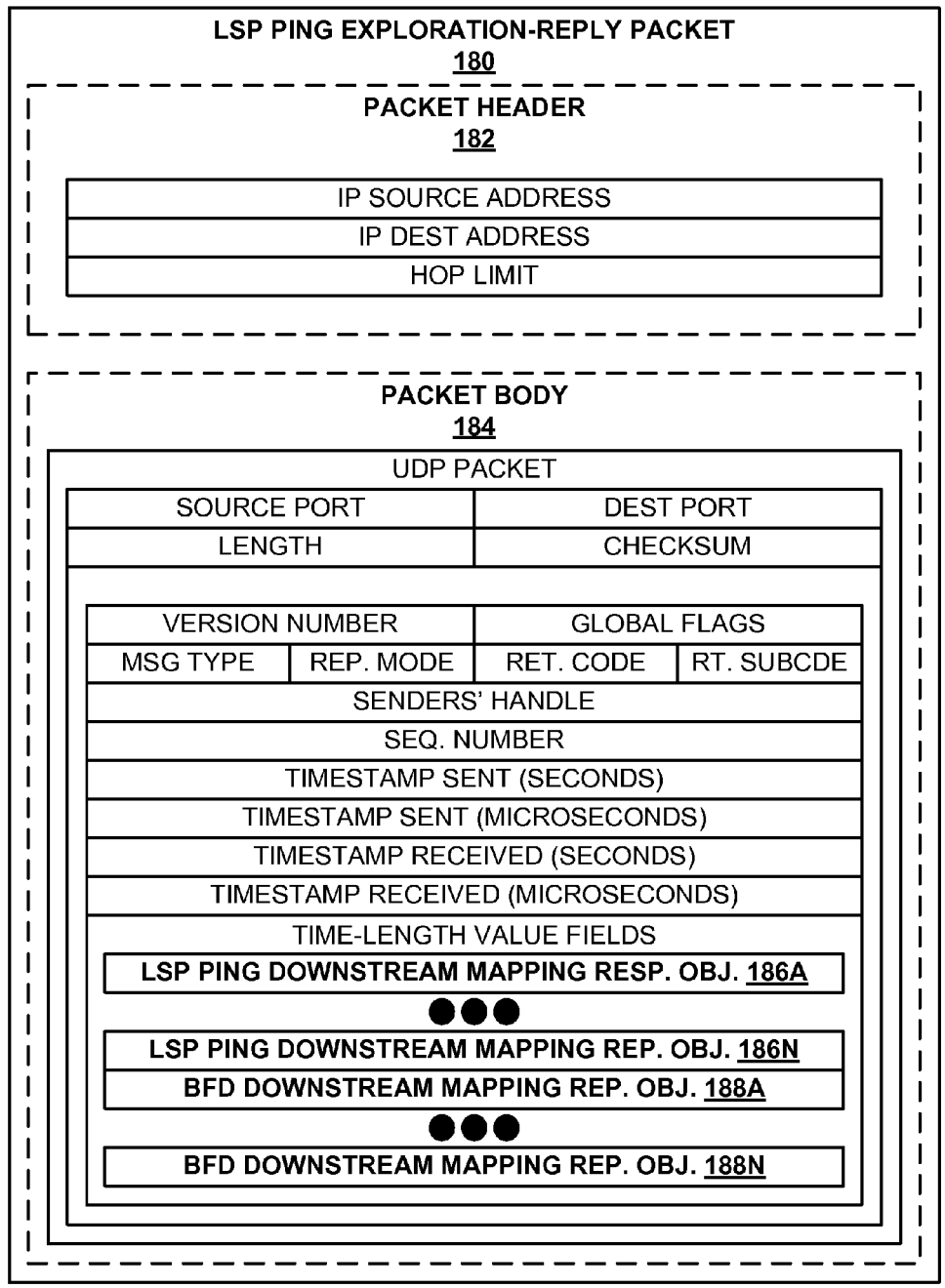
FIG. 5 is a block diagram illustrating an exemplary format of an LSP ping exploration-reply packet that has been extended to facilitate the discovery of packet header information for the Bidirectional Forwarding Detection protocol.

FIG. 5 is a block diagram illustrating an exemplary format of a LSP ping exploration-reply packet 180 that has been extended to facilitate the discovery of packet header information for the Bidirectional Forwarding Detection protocol. When a node other than the destination node of an LSP receives LSP ping exploration packet 170, the node examines the LSP ping exploration packet and may subsequently generate LSP ping exploration-reply packet 180.

As illustrated in FIG. 5, LSP ping exploration-reply packet 180 may have a similar structure to LSP ping exploration packet 170. For instance, LSP ping exploration-reply packet 180 includes a packet header 182 and a packet body 184. Moreover, packet header 182 contains an IP source address, an IP destination address, and a hop limit. In addition, packet body 184 contains a UDP packet complete with source port, destination port, length, and checksum. Like LSP ping exploration packet 170, the UDP packet in packet body 184 contains similarly structured LSP ping information.

Unlike LSP ping exploration packet 170, the TLV fields of LSP ping exploration-reply packet 180 may include LSP ping downstream mapping reply objects 186A through 186N (collectively, LSP ping downstream mapping reply objects 186) for each node on LSP 21 that is immediately downstream of the receiving node. Each of LSP ping downstream mapping reply objects 186 contains a subset of the destination addresses contained in LSP ping downstream mapping request object 186. In particular, this subset contains the destination addresses that will cause the receiving node to route an LSP ping packet having a destination address in the subset to a particular downstream node.

In addition, the TLV fields of LSP ping exploration-reply packet 180 may include BFD downstream mapping reply objects 188A through 188N (collectively, BFD downstream mapping reply objects 188) for each node on LSP 21 immediately downstream to the receiving node. BFD downstream mapping reply objects 188 may include information similar to LSP ping downstream mapping reply objects 186. In particular, each of BFD downstream mapping reply objects 188 contains a subset of the destination addresses contained in BFD ping downstream mapping request object 178. In particular, this subset contains the destination addresses that will cause the receiving node to route a BFD packet having a destination address in the subset to a particular downstream node.

Figure 6:
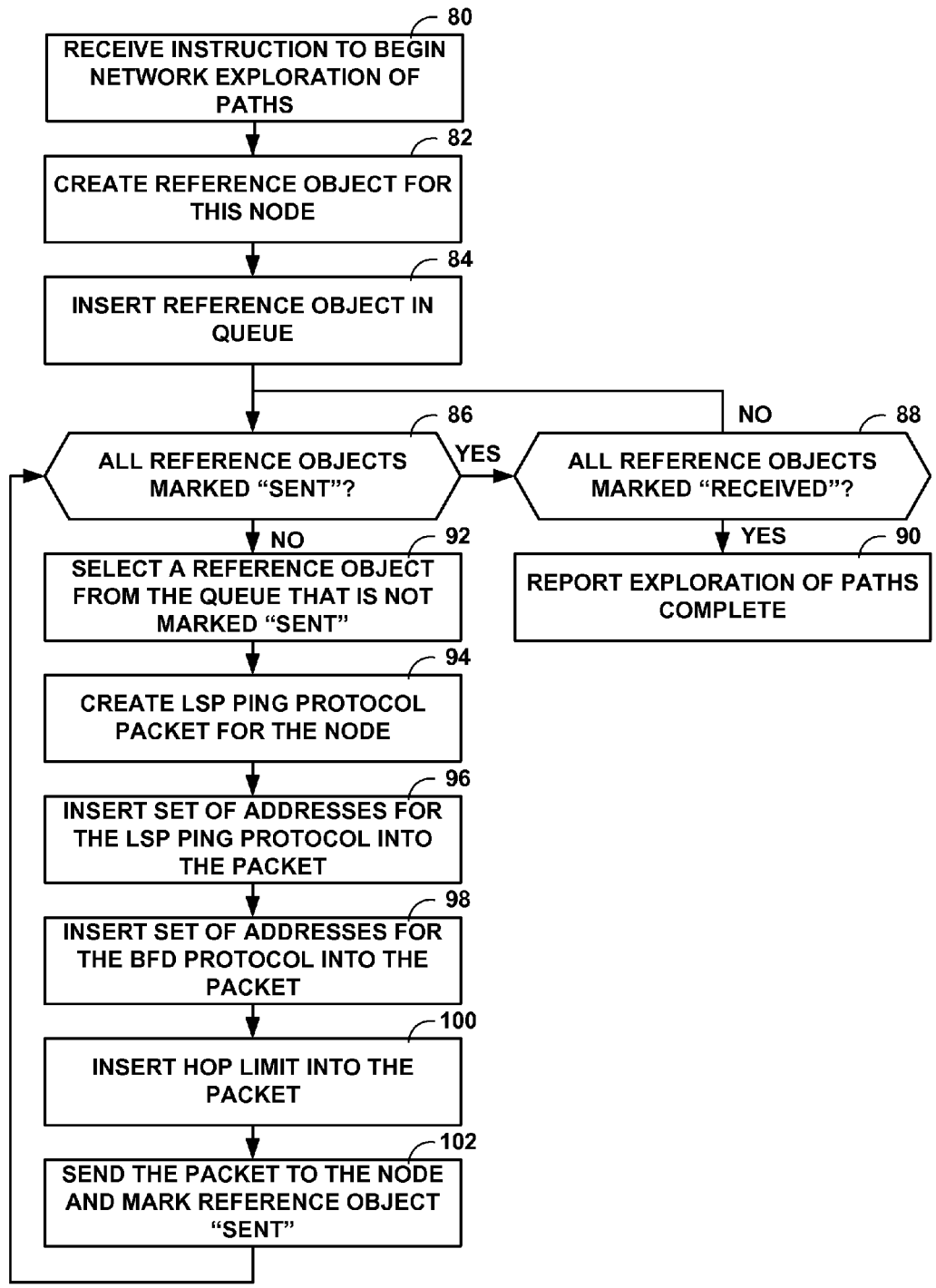
FIG. 6 is a flowchart illustrating an exemplary operation of a network exploration module of a node in accordance with the exemplary embodiment shown in FIG. 2.

FIG. 6 is a flowchart illustrating an exemplary operation of a network exploration module of a node in accordance with the exemplary embodiment shown in FIG. 2. Initially, network exploration module 46 receives instructions from routing engine 42 to begin an exploration process of a path to a destination node (80). After receiving the instructions, network exploration module 46 creates a reference object for router 30 (82). This reference may include the network address of router 30, a hop limit of 0, a set of destination addresses for the LSP ping protocol, and a set of destination addresses for the BFD protocol. Network exploration module 46 then inserts the reference object in a queue (84). After this point, network exploration module 46 may perform the same steps regarding router 30 as network exploration module 46 performs for any other node.

In particular, network exploration module 46 may check whether all of the reference objects in the queue are marked "sent" (86). If all of the reference objects in the queue are marked "sent" ("YES" of 86), network exploration module 46 may check whether all of the reference objects in the queue are marked "received" (88). If all of the reference objects in the queue are marked "received" ("YES" of 88), network exploration module 46 reports that the exploration process is complete (90). On the other hand, if one or more of the reference objects in the queue are not marked "received" ("NO" of 88), then network exploration module 46 loops back to check whether all reference objects in the queue are marked "sent" (86). If one or more of the reference objects in the queue are not marked "sent" ("NO" of 86), then network exploration module 46 selects a reference object from the queue that is not marked "sent" (92).

After selecting a reference object from the queue, network exploration module 46 creates an exploration packet in the LSP ping protocol for the node (94). Network exploration module 46 then extracts the set of destination addresses for the LSP ping protocol from the reference object and inserts the set of destination addresses for the LSP ping protocol into the exploration packet (96). Next, network exploration module 46 extracts the set of destination addresses for the BFD protocol from the reference object and inserts the set of destination addresses for the BFD protocol into the exploration packet (98). Network exploration module 46 then extracts the hop limit from the reference object and inserts the hop limit into the exploration packet (100). Once, network exploration module 46 inserts the hop limit into the exploration packet, network exploration module 46 may send the packet to the node referred to in the reference object and mark the reference object as "sent" (102).

Figure 7:
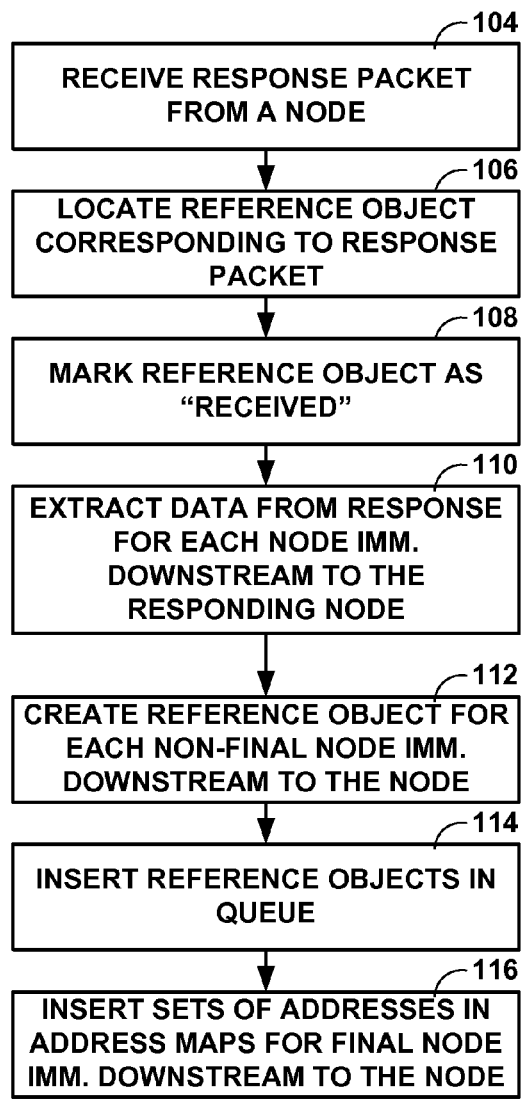
FIG. 7 is a flowchart illustrating an exemplary operation of a network exploration module of a node when the network exploration response module receives a response to an exploration packet in accordance with the exemplary embodiment shown in FIG. 2.

FIG. 7 is a flowchart illustrating an exemplary operation of a network exploration module when the network exploration module receives a response to an exploration packet in accordance with the embodiment of the invention shown in FIG. 2. Initially, network exploration module 46 receives a response packet from a node (104). After receiving the response packet, network exploration module 46 locates a reference object in the queue that corresponds to the response packet (106). Network exploration module 46 then marks this reference object as "received" (108).

After marking the reference object as "received", network exploration module 46 extracts data from the response packet for each of the nodes adjacent to the responding node (110). This data may include a set of destination addresses for the LSP ping and the BFD protocols for each of the nodes adjacent to the responding node. After extracting the data, network exploration module 46 creates a new reference object for each node immediately downstream to the responding node that is not the final node (112). This new reference object includes the set of destination addresses for the LSP ping and the BFD protocols for the node immediately downstream to the responding node. In addition, the new reference object includes the hop limit from the reference object that corresponds to the response incremented by one. Network exploration module 46 then inserts the new reference object in the queue (114). On the other hand, if one of the nodes immediately downstream to the responding node is the destination node, network exploration module 46 inserts the set of destination addresses for the LSP ping protocol into LSP ping address map 48 and inserts the set of destination addresses for the BFD protocol into BFD address map 50 (116).

Figure 8:
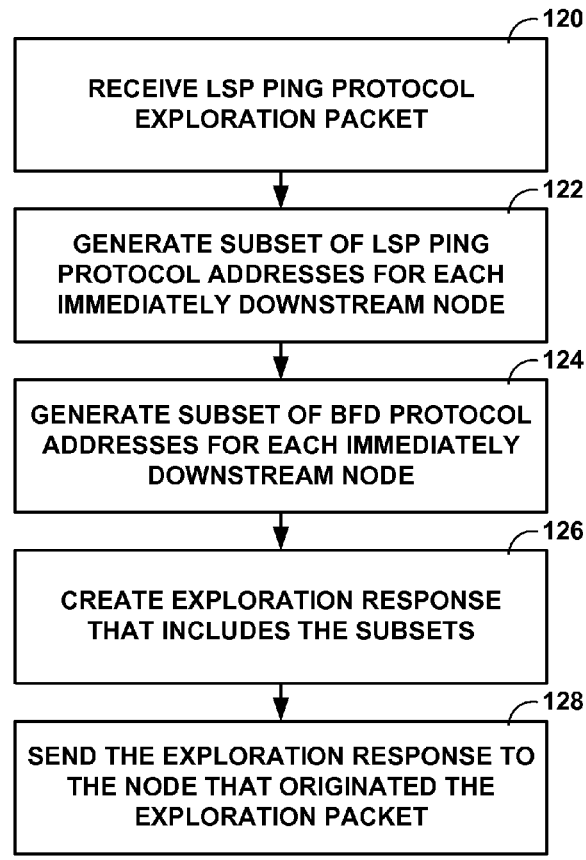
FIG. 8 is a flowchart illustrating an exemplary operation of a exploration response module when the exploration response module receives an exploration packet from another network device and creates an exploration response in accordance with the embodiment of the invention shown in FIG. 2.

FIG. 8 is a flowchart illustrating an exemplary operation of an exploration response module of a node in accordance with the exemplary embodiment shown in FIG. 2. Initially, exploration response module 52 receives an exploration packet in the LSP ping protocol (120). Exploration response module 52 then generates a subset of destination addresses for the LSP ping protocol for each node immediately downstream to router 30 (122). Next, exploration response module 52 generates a subset of destination addresses for the BFD protocol for each node immediately downstream to router 30 (124).

After generating the subsets, exploration response module 52 creates an exploration response that includes the subsets (126). Exploration response module 52 then sends the exploration response to the node in computer network 2 that originated the exploration packet (128).

Various embodiments of the invention have been described. For example, FIG. 2 shows an embodiment of a node in computer network 2 that comprises a router that uses the LSP ping and BFD protocols to verify connectivity of an LSP. Nevertheless, many variations and modifications may be made without departing from the principles of this invention. For instance, a node in computer network 2 may comprise a personal computer or another network device. In addition, the techniques of this invention may be applicable to protocols other than the LSP ping and BFD protocols. These and other embodiments are within the scope of the following claims.

The invention claimed is:

1. A method comprising:
  receiving, with an intermediate network device along a label switched path (LSP) having a plurality of alternative paths, a request that conforms to a first connectivity protocol to perform a first verification of the LSP;
  generating, with the intermediate network device, first packet header information that conforms to the first connectivity protocol and second packet header information that conforms to a second connectivity protocol, wherein the first packet header information and the second packet header information are associated with two or more of the plurality of alternative paths of the LSP; and
  sending the first packet header information and the second packet header information from the intermediate network device to a network device in a single reply packet that conforms to the first connectivity protocol,
  wherein the first packet header information and the second packet header information in the reply packet instruct the network device with packet header information to form packets and direct the packets along the individual paths in accordance with both the first connectivity protocol and the second connectivity protocol.

2. The method of claim 1, wherein the first connectivity protocol is a Label Switched Path (LSP) Ping protocol and the second connectivity protocol is a Bidirectional Forwarding Detection protocol.

3. The method of claim 2, wherein the request comprises an exploration packet conforming to the LSP Ping protocol and the reply packet comprises an exploration response.

4. The method of claim 3,
  wherein the exploration packet specifies a set of variable information in accordance with the LSP Ping protocol, and
  wherein generating first packet header information comprises generating the first packet header information to include variable information for the LSP Ping protocol associated with a path from the intermediate network device to a second network device along one of the paths.

5. The method of claim 3,
  wherein the exploration packet specifies a set of variable information in accordance with the Bidirectional Forwarding Detection protocol, and
  wherein generating second packet header information comprises generating the second packet header information to include variable information for the BFD protocol associated with a path from the intermediate network device to a second network device along one of the paths.

6. A network device comprising:
  a processor; and
  an exploration response module executing on the processor to receive an exploration packet in accordance with a first connectivity protocol,
  wherein the exploration response module generates first packet header information that conforms to the first connectivity protocol and second packet header information that conforms to a second connectivity protocol,
  wherein the first packet header information and the second packet header information is associated with two or more of the plurality of alternative paths of a label switched path (LSP),
  wherein the first packet header information and the second packet header information specify respective packet header information necessary to direct packets along the individual paths in accordance with both the first connectivity protocol and the second connectivity protocol, and
  wherein the exploration response module sends the first packet header information and the second packet header information from the intermediate node to a network device in a single reply packet that conforms to the first connectivity protocol.

7. The network device of claim 6, wherein the first connectivity protocol is a Label Switched Path (LSP) Ping protocol and the second connectivity protocol is a Bidirectional Forwarding Detection (BFD) protocol.

8. The network device of claim 7, wherein the exploration packet conforms to the LSP Ping protocol and the reply packet comprises an exploration response.

9. The network device of claim 8,
  wherein the exploration packet specifies a set of variable information in accordance with the LSP Ping protocol, and
  wherein the exploration response module generates the first packet header information to include variable information for the LSP Ping protocol associated with a path from the network device to a third network device along one of the paths.

10. The network device of claim 8,
  wherein the exploration packet specifies a set of variable information in accordance with the Bidirectional Forwarding Detection protocol, and
  wherein generating second packet header information comprises generating the second packet header information to include variable information for the BFD protocol associated with a path from the intermediate network device to a third network device along one of the paths.

11. A non-transitory computer-readable medium comprising instructions to cause a network device to:
  receive a request that conforms to a first connectivity protocol to perform a first verification of a label switched path (LSP);

generate first packet header information that conforms to the first connectivity protocol and second packet header information that conforms to a second connectivity protocol; and send the first packet header information and the second packet header information in a single reply packet that conforms to the first connectivity protocol, wherein the first packet header information and the second packet header information in the reply packet specify respective packet header information necessary to direct packets along the individual paths in accordance with both the first connectivity protocol and the second connectivity protocol.

12. The non-transitory computer-readable medium of claim 11, wherein the first connectivity protocol is a Label Switched Path (LSP) Ping protocol and the second connectivity protocol is a Bidirectional Forwarding Detection protocol.

13. The non-transitory computer-readable medium of claim 12, wherein the request comprises an exploration packet conforming to the LSP Ping protocol and the reply packet comprises an exploration response.

14. The non-transitory computer-readable medium of claim 13,
wherein the exploration packet specifies a set of variable information in accordance with the LSP Ping protocol, and
wherein the instructions cause the network device to generate the first packet header information to include variable information for the LSP Ping protocol associated with a path from the network device to a second network device along one of the paths.

15. The non-transitory computer-readable medium of claim 13,
wherein the exploration packet specifies a set of variable information in accordance with the Bidirectional Forwarding Detection protocol, and
wherein the instructions cause the network device to generate the second packet header information to include variable information for the BFD protocol associated with a path from the network device to a second network device along one of the paths.

* * * * *